(12) United States Patent
Kato

(10) Patent No.: US 8,155,944 B2
(45) Date of Patent: Apr. 10, 2012

(54) TRANSLATION APPARATUS, TRANSLATION METHOD AND COMPUTER READABLE MEDIUM

(75) Inventor: Masahiro Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1062 days.

(21) Appl. No.: 12/076,183

(22) Filed: Mar. 14, 2008

(65) Prior Publication Data
US 2009/0055159 A1 Feb. 26, 2009

(30) Foreign Application Priority Data

Aug. 24, 2007 (JP) ................................. 2007-218545

(51) Int. Cl.
*G06F 17/28* (2006.01)
(52) U.S. Cl. ............. 704/2; 704/3; 704/4; 704/7; 704/8; 715/264
(58) Field of Classification Search .................. 704/2–8; 715/264
See application file for complete search history.

(56) References Cited

U.S. PATENT DOCUMENTS

| | | | | |
|---|---|---|---|---|
| 5,517,409 | A * | 5/1996 | Ozawa et al. ...................... | 704/3 |
| 6,438,515 | B1 * | 8/2002 | Crawford et al. .................. | 704/5 |
| 6,789,057 | B1 * | 9/2004 | Morimoto et al. ................. | 704/2 |
| 2002/0013693 | A1 * | 1/2002 | Fuji ................................. | 704/2 |
| 2002/0042790 | A1 * | 4/2002 | Nagahara ........................... | 707/4 |
| 2002/0077804 | A1 * | 6/2002 | Gohari .............................. | 704/2 |
| 2003/0061022 | A1 * | 3/2003 | Reinders ........................... | 704/2 |
| 2006/0217954 | A1 * | 9/2006 | Koyama et al. .................... | 704/2 |
| 2006/0217961 | A1 * | 9/2006 | Masuichi et al. ................. | 704/3 |
| 2008/0082317 | A1 * | 4/2008 | Rosart et al. ..................... | 704/8 |

FOREIGN PATENT DOCUMENTS

| | | |
|---|---|---|
| JP | A-5-324720 | 12/1993 |
| JP | A-7-28829 | 1/1995 |
| JP | A-07-121539 | 5/1995 |
| JP | B2-3213197 | 1/1996 |
| JP | JP-8-6948 | 1/1996 |
| JP | B2-3636490 | 5/1996 |

* cited by examiner

*Primary Examiner* — David R Hudspeth
*Assistant Examiner* — Lamont Spooner
(74) *Attorney, Agent, or Firm* — Oliff & Berridge, PLC

(57) ABSTRACT

A translation apparatus includes: an image acquiring unit that acquires an original document image read from an original document including an original sentence in a first language; a translating unit that translates the original sentence into a second language; a line-space specifying unit that specifies a line-space region for each line of the original sentence; a first translation document creating unit that creates a first translation document by arranging a translation sentence in each line-space region of the original document image; a second translation document creating unit that creates a second translation document; a determining unit that determines whether a non-interference condition is satisfied on the basis of each line-space region; and an output unit that outputs the first translation document in a case where the non-interference condition is satisfied, or that outputs the second translation document in a case where the non-interference condition is not satisfied.

20 Claims, 11 Drawing Sheets

ADDITIONAL WORD-TYPE TRANSLATION DOCUMENT

☐ CHARACTER OF TRANSLATION SENTENCE DISPOSED IN LINE-SPACE REGION LARGER THAN TH

○ CHARACTER OF TRANSLATION SENTENCE IN LINE-SPACE REGION NOT MORE THAN TH

TRANSLATION-REPLACED DOCUMENT

☐ CHARACTER OF TRANSLATION SENTENCE OF WHICH CIRCUMSCRIBED RECTANGLE DOES NOT INCLUDE CHARACTER OF ORIGINAL SENTENCE

◯ CHARACTER OF TRANSLATION SENTENCE OF WHICH CIRCUMSCRIBED RECTANGLE INCLUDES CHARACTER OF ORIGINAL SENTENCE

*FIG. 12*

と共存し
environment
る地球環境や

TRANSLATION APPARATUS, TRANSLATION METHOD AND COMPUTER READABLE MEDIUM

CROSS-REFERENCE TO RELATED APPLICATIONS

This application is based on and claims priority under 35 U.S.C. 119 from Japanese Patent Application No. 2007-218545 filed Aug. 24, 2007.

BACKGROUND

1. Technical Field

The present invention relates to a translation apparatus, a translation method, and a computer readable medium.

2. Related Art

There is known a device that analyzes a scan image of a document with an original sentence in a first language to translate and output the original sentence included in the scan image into a second language.

SUMMARY

According to an aspect of the present invention, a translation apparatus includes: an image acquiring unit that acquires an original document image read from an original document including an original sentence in a first language; a translating unit that translates the original sentence included in the original document image into a second language; a line-space specifying unit that specifies a line-space region for each line of the original sentence included in the original document image; a first translation document creating unit that creates a first translation document by arranging a translation sentence in each line-space region of the original document image; a second translation document creating unit that creates a second translation document by replacing the original sentence in the original document image with the translation sentence; a determining unit that determines whether a non-interference condition if the original sentence overlaps with the translation sentence is satisfied on the basis of each line-space region; and an output unit that outputs the first translation document in a case where the non-interference condition is satisfied, or that outputs the second translation document in a case where the non-interference condition is not satisfied.

BRIEF DESCRIPTION OF THE DRAWINGS

Exemplary embodiment of the present invention will be described in detail based on the following figures, wherein:

FIG. 11 is a diagram illustrating a sate where the overlap ratio is calculated;

FIG. 12 is a diagram illustrating a state where the overlap ratio is calculated;

DETAILED DESCRIPTION

Figure 1:
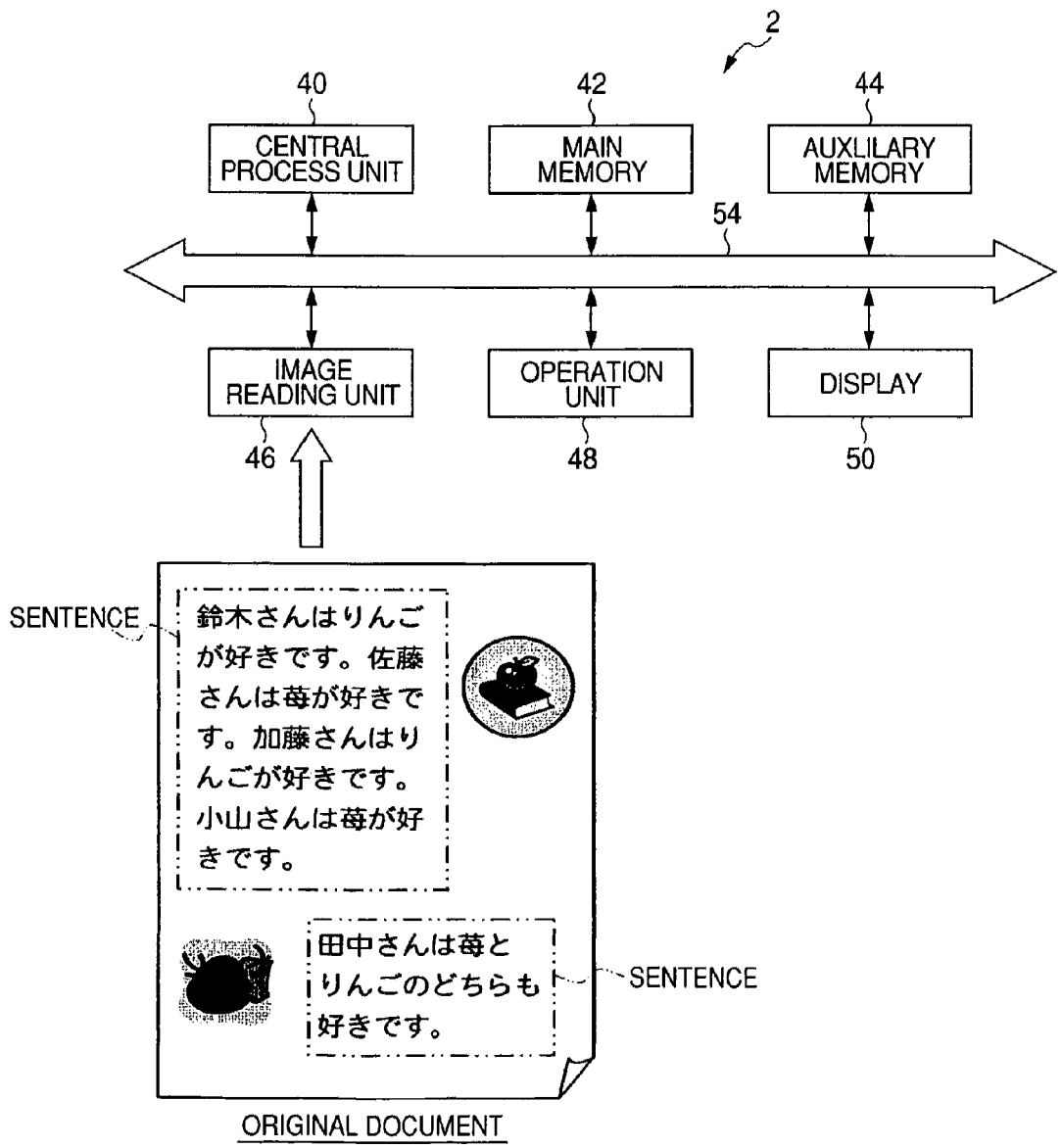
FIG. 1 is a diagram illustrating an example of a hardware configuration of a translation apparatus according to an embodiment of the invention.

An exemplary embodiment of the invention will be described with reference to the accompanying drawings. FIG. 1 is a diagram illustrating an example of a hardware configuration of a translation apparatus 2 according to an embodiment of the invention. As shown in the same drawing, the translation apparatus 2 includes a central process unit 40, a main memory 42, an auxiliary memory 44, an image reading unit 46, an operation unit 48, and a display 50. The respective units can communicate with one another through a data bus 54. The translation apparatus 2 includes a network interface, a printer, and the like which are not shown in the drawings.

The central process unit 40 is a CPU or an MPU. The central process unit 40 is operated to control the respective units by using a program stored in advance in the main memory 42. Additionally, the central process unit 40 performs a calculation operation using information stored in the main memory 42, and then outputs the calculated values to the main memory 42. The program is not limited to a program stored in the main memory 42, but also may be a program stored in an information storing medium such as a CD-ROM or a DVD-ROM, or a program supplied from a network.

The main memory 42 is a memory element such as a RAM or a ROM. The main memory 42 stores the program. Additionally, the main memory 42 stores the information input from the respective units.

The auxiliary memory 44 is a hard disk and the like. The auxiliary memory 44 stores the information stored in the main memory 42 in response to a control signal output from the central process unit 40.

The image reading unit 46 is a scanner. The image reading unit 46 reads an original document in response to a control signal output from the central process unit 40, and then outputs the read original document image to the main memory 42. Here, the original document includes a sentence written in a first language. Here, the first language is Japanese.

The operation unit 48 is a keyboard, a mouse, and the like. The operation unit 48 outputs operation information to the main memory 42.

The display 50 displays the information stored in the main memory 42 in response to the control signal output from the central process unit 40.

Figure 2:
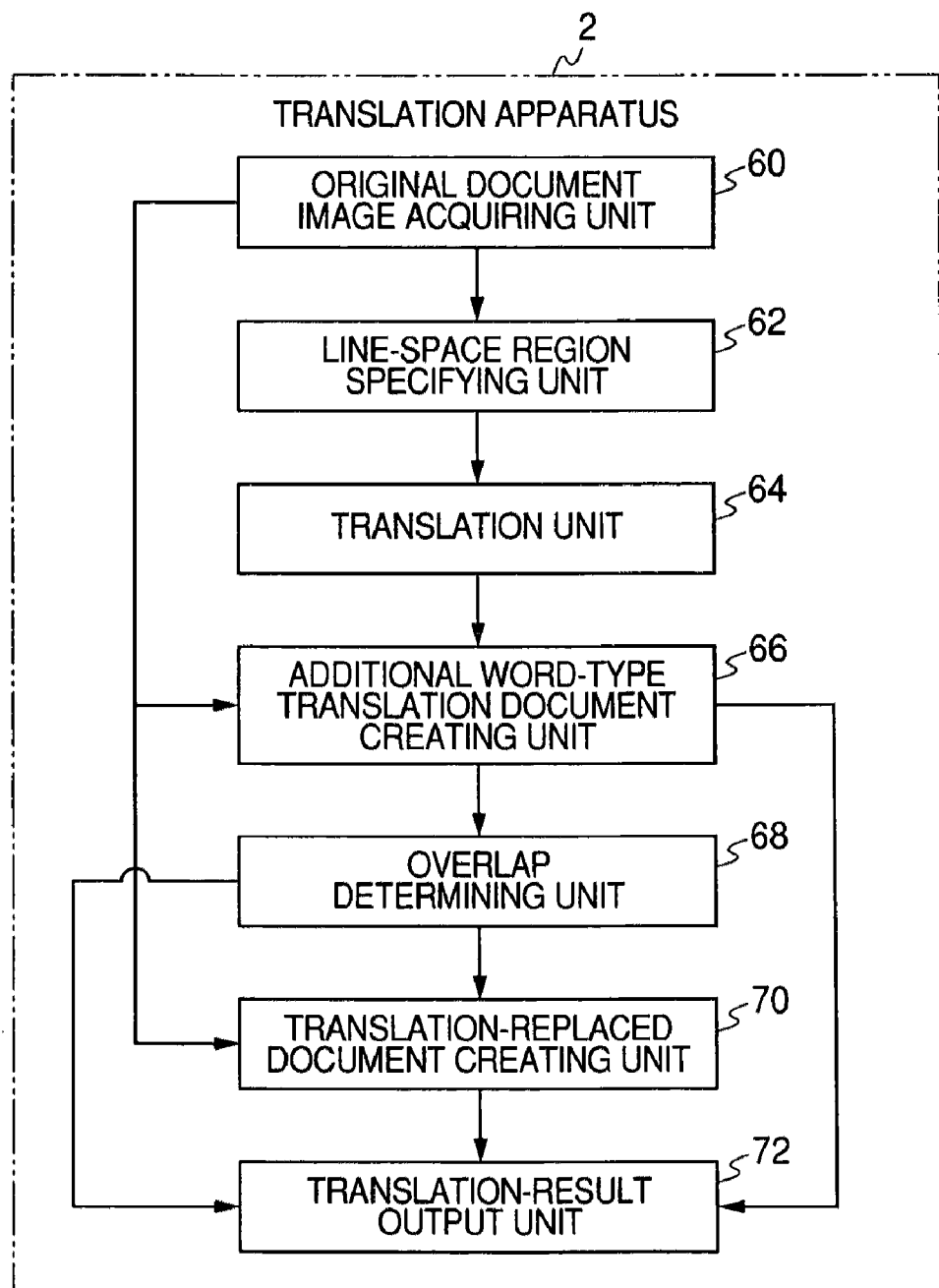
FIG. 2 is a diagram illustrating an example of a functional block of the translation apparatus according to the embodiment of the invention.

FIG. 2 is a block diagram illustrating functions realized by the translation apparatus 2 when the central process unit 40 is operated based on the program. Here, the functions related to the invention will be mainly described. As shown in the same drawing, the translation apparatus 2 includes an original document image acquiring unit 60, a line-space region specifying unit 62, a translation unit 64, an additional word-type translation document creating unit 66, an overlap determining unit 68, a translation-replaced document creating unit 70, and a translation-result output unit 72.

The original document image acquiring unit 60 is mainly realized by the image reading unit 46. The original document image acquiring unit 60 reads the original document and thus acquires the original document image.

The line-space region specifying unit 62 is mainly realized by the central process unit 40. The line-space region specifying unit 62 analyzes a layout of the original document image acquired by the original document acquiring unit 60, and then specifies the line-space region between the lines of sentences included in the original document image.

Figure 3:
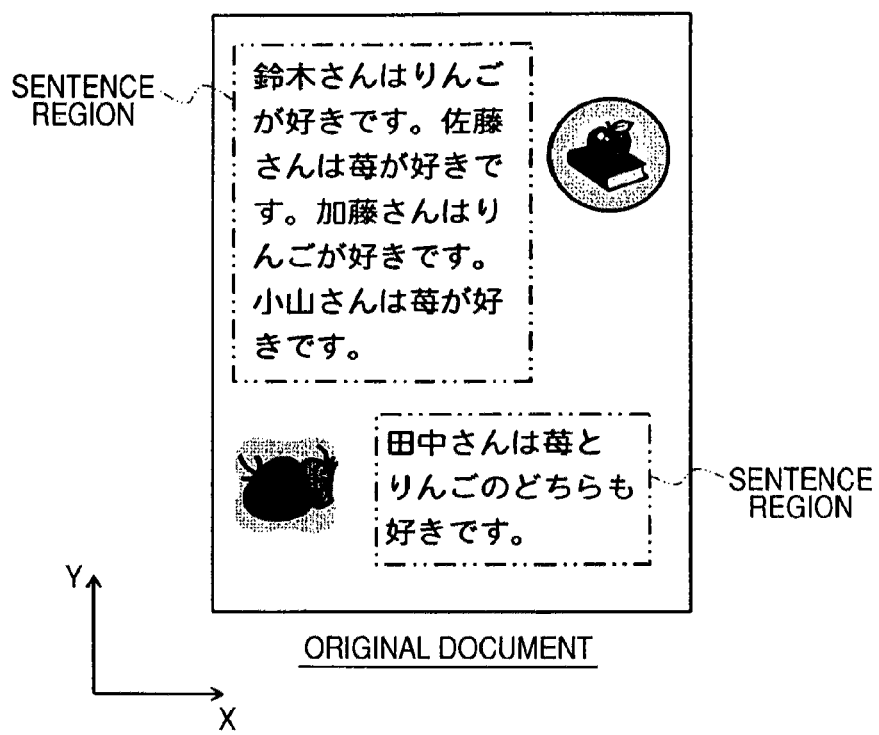
FIG. 3 is a diagram illustrating an example of an original document.

In this embodiment, the line-space region specifying unit 62 analyzes the layout of the original document image, and then specifies a sentence region of each sentence (see FIG. 3). Additionally, the line-space specifying unit 62 specifies a character line region for the sentence region.

Figure 4:
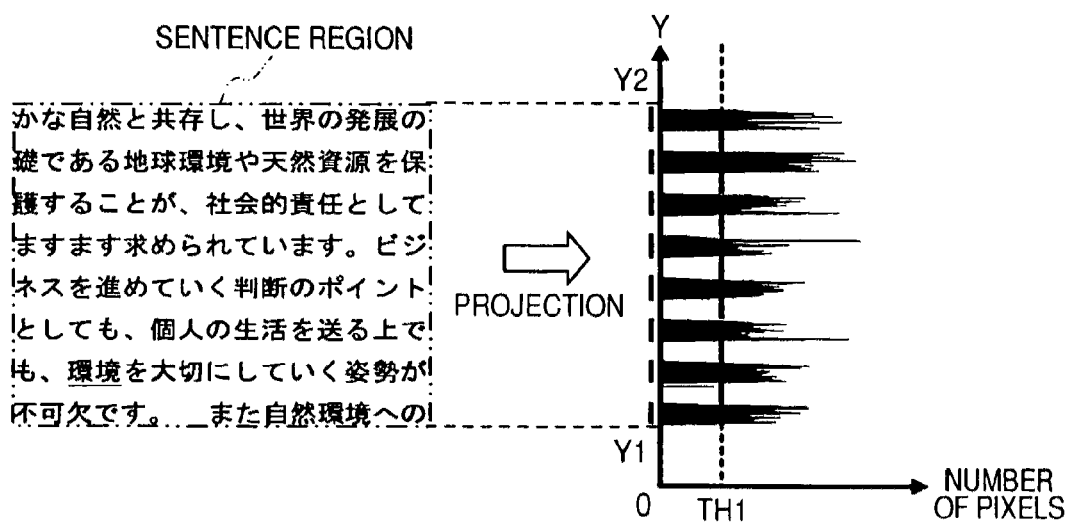
FIG. 4 is a diagram illustrating a state where a line-space region and a character line region are specified.
Figure 5:
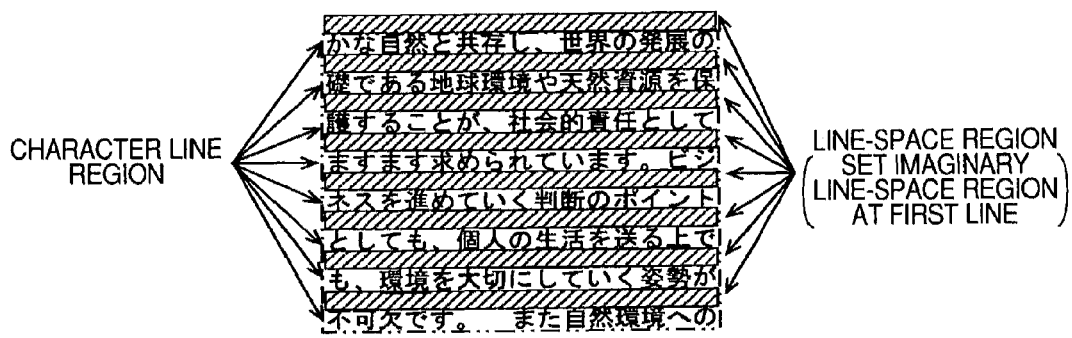
FIG. 5 is a diagram illustrating an example of the line-space region and the character line region.

Specifically, as shown in FIG. 4, the line-space specifying unit 62 performs a projection calculation of a pixel (character pixel) which is thought to form a character for each sentence region, and creates a projection histogram with respect to a direction (a Y axis in case of a horizontal direction or an X axis in case of a vertical direction) which is perpendicular to a direction where the characters are connected to each other in the sentence region. Then, the line-space specifying unit 62 specifies the character line region for each sentence region based on the projection histogram of each sentence region. That is, the line-space specifying unit 62 specifies a coordinate region in which the number of character pixels continues one or more in the projection axis for each sentence region, and sets the specified region to a vertical width of each character line region. Additionally, the line-space specifying unit 62 sets the horizontal width of the sentence region to a horizontal width of each character line region. In this way, the line-space specifying unit 62 specifies the character line region for each sentence region as shown in FIG. 5.

Further, the line-space specifying unit 62 calculates a frequency threshold value TH1 for specifying the line-space region based on the projection histogram of each sentence region. Here, in every sentence region, the number of average character pixels Nm is calculated in the manner that the number of the total character pixels is divided by the vertical width of the sentence region. Also, the value that the calculated number of average character pixels Nm is multiplied by 1/a (where, 'a' is a constant which is set in advance) is referred to as TH1. For example, as shown in FIG. 4, the number of average character pixels Nm corresponds to a quotient that the number of total character pixels in the sentence region is divided by the vertical width (Y2–Y1) of the sentence region, and TH1 corresponds to a quotient that the Nm is again divided by the a.

The line-space specifying unit 62 specifies a Y-axis region in which the number of character pixels continues TH1 or less in every sentence region, and the specified region is set to the vertical width of every line-space region. Additionally, the horizontal width of the sentence region is set to the horizontal width of each line-space region. In this way, as shown in FIG. 5, the line-space specifying unit 62 specifies the line-space region for each sentence region. The line-space specifying unit 62 specifies even a predetermined region imaginarily provided in the upper portion of the character line region at a first line to the line-space region.

The translation unit 64 is mainly realized by the central process unit 40. The translation unit 64 translates each sentence included in the original document image into a second language.

In this embodiment, the translation unit 64 recognizes the sentence included in the sentence region for every sentence region specified by the line-space specifying unit 62, and then translates the recognized sentence into a second language. Here, the second language is English.

Figure 6:
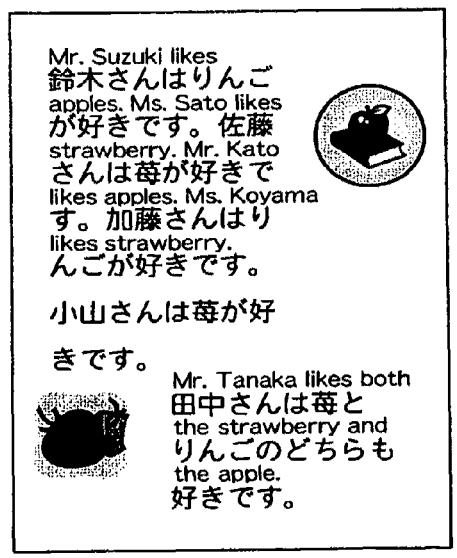
FIG. 6 is a diagram illustrating an example of an additional word-type translation document.

The additional word-type translation document creating unit 66 is mainly realized by the central process unit 40. The additional word-type translation document creating unit 66 creates a first translation document by arranging a translation sentence in each line-space region of the original document image in such a manner that an additional word is marked in the original sentence. Here, the additional word-type translation document creating unit 66 creates image data (i.e., bitmap data) of the additional word-type translation document shown in FIG. 6 in such a manner that the translation sentence is arranged in each line-space region.

Specifically, the additional word-type translation document creating unit 66 creates a copy of the original document image. Additionally, the additional word-type translation document creating unit 66 arranges an image of each character of the translation sentence of the sentence included in the corresponding sentence region in each line-space region of the sentence region of each sentence region of the copied original document image. Here, the additional word-type translation document creating unit 66 arranges an image of each character of the translation sentence in a predetermined character size based on the combination of the first language and the second language. Additionally, the additional word-type translation document creating unit 66 arranges the image of each character of the translation sentence in a character color depending on a background color of the line-space region. For example, the additional word-type translation document creating unit 66 may arrange the image of each character of the translation sentence with a predetermined character color with respect to the background color of the line-space region, or may arrange the image of each character in a character color of which the color is slightly different from the background color of the line-space region. In this way, the additional word-type translation document creating unit 66 creates the image data of the additional word-type translation document. When the translation sentence is arranged in each line-space region, the character size of the translation sentence may be larger than that of the original sentence, or may be smaller than that of the original sentence.

The overlap determining unit 68 is mainly realized by the central process unit 40. The overlap determining unit 68 determines whether a non-interference condition if the original sentence overlaps with the translation sentence is satisfied in the additional word-type translation document.

Figure 7:
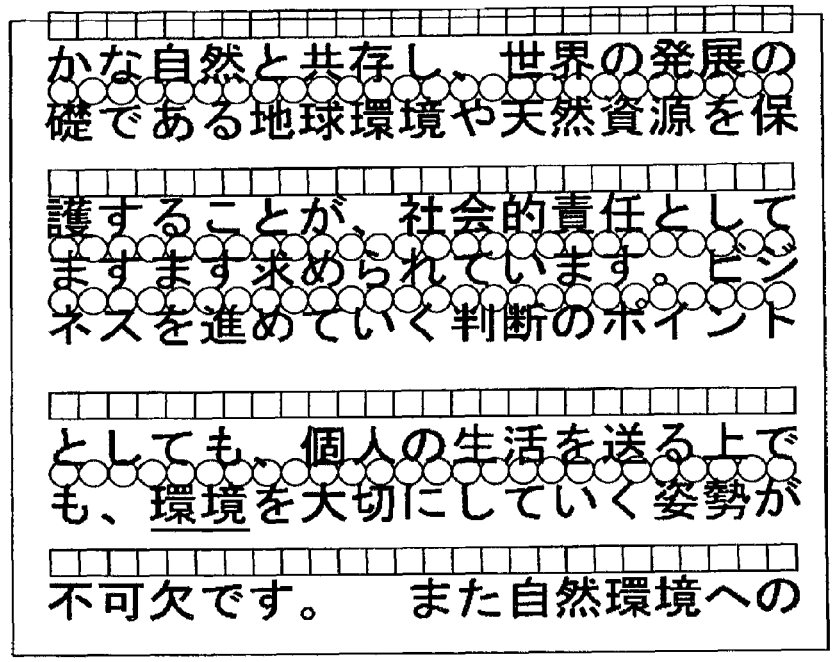
FIG. 7 is a diagram illustrating a state where an overlap ratio is calculated.

In this embodiment, as shown in FIG. 7, the overlap determining unit 68 counts the number of characters N1 which are arranged in the line-space region corresponding to the line-space region smaller than the predetermined line space TH2 by referring to the image data of the additional word-type translation document. The overlap determining unit 68 calculates a ratio P1 (N1/Mtotal) of the number of characters N1 with respect to the number of total characters Mtotal so as to determine whether the ratio P1 is a predetermined threshold value TH3 or less. Here, the predetermined line space TH2 is the height of the character of the translation sentence. The character size of the translation sentence is a size previously set based on the combination of the first language and the second language, the line space TH2 changes depending on the combination of the first language and the second language. Hereinafter, the ratio P1 will be referred to as an overlap ratio.

When the overlap ratio is larger than the TH3, the overlap determining unit 68 determines that the non-interference condition is not satisfied. Meanwhile, when the overlap ratio is not more than the TH3, the overlap determining unit 68 determines that the non-interference condition is satisfied. The overlap determining unit 68 outputs a determination result to the translation-result output unit 72.

Figure 8:
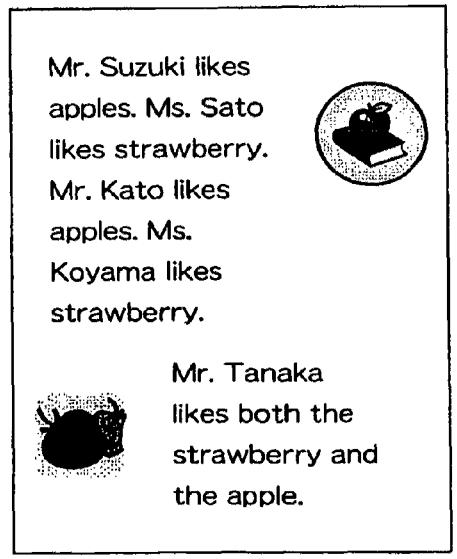
FIG. 8 is a diagram illustrating an example of a translation-replaced document.

The translation-replaced document creating unit 70 is mainly realized by the central process unit 40. The translation-replaced document creating unit 70 creates a second translation document in which the sentence of the original document image is replaced by the translation sentence. Here, the translation-replaced document creating unit 70 creates image data of the translation-replaced document shown in FIG. 8 in which the sentence included in each sentence region is replaced by the translation sentence.

Specifically, the translation-replaced document creating unit 70 creates a copy of the original document image. Then, the translation-replaced document creating unit 70 decides the background color for each sentence region of the copied original document image, and paints the corresponding sentence region with the decided background color. For example, the translation-replaced document creating unit 70 paints each sentence region with the background color of one of line-space region included in the corresponding sentence region. Then, the translation-replaced document creating unit 70 arranges the image of the translation sentence in each sentence region. In this way, the translation-replaced document creating unit 70 creates the image data of the translation-replaced document. Here, the translation-replaced document creating unit 70 decides the character size of the translation sentence so that the translation sentence is inserted to the sentence region. The character color of the translation sentence may be a predetermined color or a color that is different from the background color of the sentence region.

The translation-result output unit 72 is mainly realized by the display 50. The translation-result output unit 72 outputs the translation result depending on the determination result of the overlap determining unit 68.

In this embodiment, when the non-interference condition is satisfied, the translation-result output unit 72 outputs the image of the additional word-type translation document on the display 50 on the basis of the image data of the additional word-type translation document, or when the non-interference condition is not satisfied, the translation-result output unit 72 outputs the image of the additional word-type translation document and the image of the translation-replaced document to the display 50 on the basis of the image data of the translation-replaced document. When the non-interference condition is not satisfied, the translation-result output unit 72 may output only the image of the translation-replaced document to the display 50. Additionally, the translation-result output unit 72 may print out the image of the additional word-type translation document or the image of the translation-replaced document.

Next, exemplary processes that are performed by the translation apparatus 2 having the above-described functions will be described with reference to the flowchart shown in FIG. 9. In this embodiment, when a user performs a translation instruction operation by allowing the translation apparatus 2 to read the original document, the process is performed.

The translation apparatus 2 acquires the original document image by reading the original document (S101). Subsequently, the translation apparatus 2 analyzes the layout of the original document image by the function of the line-space specifying unit 62, and specifies the sentence region (S102). Alternatively, the translation apparatus 2 specifies the character line region and the line-space region for every sentence region by the function of the line-space region specifying unit 62 (S103).

Subsequently, the translation apparatus 2 recognizes a character in each character line region by an OCR process (S104). Subsequently, the translation apparatus 2 combines the recognized characters in each sentence region (S105). In this way, the translation apparatus 2 recognizes the sentence included in the corresponding sentence region in each sentence region. Subsequently, the translation apparatus 2 translates the sentence into a second language in each sentence region, and creates texts of the translation sentence (S106).

Subsequently, the translation apparatus 2 creates image data of the additional word-type translation document (S107). Specifically, the translation apparatus 2 creates the image data of the additional word-type translation document by performing the processes shown in the flowchart of FIG. 10.

That is, the translation apparatus 2 creates a copy of the original document image. Subsequently, the translation apparatus 2 performs a known extended definition process such as a skew compensation or an under color removal (S201). Subsequently, the translation apparatus 2 selects the sentence region (remark sentence region) of the process target from the copied original document image (S202). Subsequently, the translation apparatus 2 selects a remark line-space region from the remark sentence region (S203). Subsequently, the translation apparatus 2 specifies the background color of the remark line-space region, and decides the character color of the translation sentence depending on the specified background color (S204). For example, the translation apparatus 2 sets a color that is decided in advance with respect to the specified background color or a color that is different from the specified background color to the character color of the translation sentence. Subsequently, the translation apparatus 2 arranges the image of each character of the translation sentence in the remark line-space region using the character color specified in Step S204 (S205).

Subsequently, when the image of each character of the translation sentence is not arranged in every line-space region (N: S206), the translation apparatus 2 returns to the Step S203, or when the image of each character of the translation sentence is arranged in every line-space region (Y: S206), the translation apparatus 2 advances to the Step S207. Subsequently, when the processes from S203 to S206 are not performed in every sentence region (N: S207), the translation apparatus 2 returns to the. Step S202, or when the processes from S203 to S206 are performed in every sentence region, the translation apparatus 2 ends the process. In this way, the translation apparatus 2 creates the image data of the additional word-type translation document. The translation apparatus 2 smoothes the remark line-space region by the known method after the Step S203, and then may advance to the Step S204. For example, the translation apparatus 2 calculates the number of pixels of which the pixel value (i.e., RGB value, contrast value, brightness value, etc.) is different by a predetermined value or more from an average value of the pixel values in the neighborhood pixels, in the pixels of the remark line-space region after the Step S203. Then, when a ratio of the calculated number of pixels with respect to the number of the total pixels of the remark line-space region is not less than a predetermined ratio, the translation apparatus 2 may smooth the remark line-space region. Alternatively, the translation apparatus 2 paints the remark line-space region with a predetermined color (i.e., a white etc.) after the Step S203, and then may advance to the Step S204.

When the image data of the additional word-type translation document is created, the translation apparatus 2 calculates the ratio P1, that is, the overlap ratio by the function of the overlap determining unit 68 (S109). Here, the translation apparatus 2 may calculate the number of characters N1 by calculating the number of characters that are arranged in each line-space region based on the length (horizontal width) of each line-space region and the character size of the translation sentence. In this case, since the translation apparatus 2 does not use the image data of the additional word-type translation document in order to calculate the overlap ratio, the image data of the additional word-type translation document may be created in the step after the Step S108.

Here, the overlap ratio is set to the ratio P1 of the number of the characters N1 that are arranged in the line-space region corresponding to the line-space region smaller than the line space TH2 with respect to the number of total pixels Mtotal of the translation sentence, but the overlap ratio maybe a different value. For example, the translation apparatus 2 sets a circumscribed rectangle for each character of the translation sentence by referring to the image data of the additional word-type translation document. Then, as shown in FIG. 11, the translation apparatus 2 determines whether the characters of the original sentence are partly or entirely included in the circumscribed rectangle region in each character of the translation sentence, that is, the characters of the original sentence interfere with the circumscribed rectangle region, and then counts the number of characters N2 in which the characters of the original sentence interfere with the circumscribed rectangle region. Then, the translation apparatus 2 calculates a ratio P2 of the number of characters N2 with respect to the number of total characters Mtotal. The ratio P2 obtained in this way may be set to the overlap ratio.

Additionally, for example, the translation apparatus 2 counts the sum of the number of pixels N3 in the entire portion in which the characters of the translation sentence interfere with the characters of the original sentence by referring to the image data of the additional word-type translation document (see FIG. 12). Then, the translation apparatus 2 calculates a ratio P3 of the number of pixels N3 with respect to the sum of the number of pixels Mtotal in the total characters of the translation sentence. The ratio P3 obtained in this way may be set to the overlap ratio.

When the overlap ratio is calculated in this way, the translation apparatus 2 determines whether the non-interference condition is satisfied. That is, the translation apparatus 2 determines whether the overlap ratio is not more than the predetermined threshold value TH3 (S109). When the overlap ratio is not more than the predetermined threshold value TH3 (Y: S109), the translation apparatus 2 outputs the image of the additional word-type translation document on the basis of the image data of the additional word-type translation document (S110) For example, the translation apparatus 2 displays the image of the additional word-type translation document on the display 50, or prints out the image thereof in terms of a printer.

On the other hand, when the overlap ratio is larger than the predetermined threshold value TH3 (N: S109), the translation apparatus 2 creates the image data of the translation-replaced document (S111). Specifically, the translation apparatus 2 creates the image data of the translation-replaced document by performing the processes shown in the flowchart of FIG. 13.

That is, the translation apparatus 2 creates the copy of the original document image, and performs a known extended definition process such as a skew compensation or an under color removal to the copied original document image (S301). Subsequently, the translation apparatus 2 selects the sentence region (remark sentence region) of the process target from the copied original document image, and decides the background color of the remark sentence region (S302). For example, the translation apparatus 2 sets the background color of one of line-space regions included in the remark sentence region to the background color of the remark sentence region. Subsequently, the translation apparatus 2 paints the remark sentence region with the background color decided in the Step S302 (S303).

Subsequently, the translation apparatus 2 decides the character color of the translation sentence arranged in the remark sentence region (S304). For example, the translation apparatus 2 sets the character color of the translation sentence to a predetermined color relative to the background color decided in the Step S302 or a color that is different from the corresponding background color. Subsequently, the translation apparatus 2 decides the character size of the translation sentence arranged in the remark sentence region (S305). For example, the translation apparatus 2 decides the character size of the translation sentence so that the translation sentence is inserted to the remark sentence region.

Subsequently, the translation apparatus 2 arranges the image of the translation sentence in the remark sentence region (S306). Subsequently, the translation apparatus 2 checks whether the image of the translation sentence is arranged in every sentence region (S307), and when the image of the translation sentence is not arranged in every sentence region (N: S307), the translation apparatus 2 returns to the Step S302. On the other hand, when the image of the translation sentence is arranged in every sentence region (Y: S307), the translation apparatus 2 ends the process. In this way, the translation apparatus 2 creates the image data of the translation-replaced document. The translation apparatus 2 may create the image data of the translation-replaced document in the Step before Step S109.

When the image data of the translation-replaced document is created in this way, the translation apparatus 2 outputs the image of the additional word-type translation document and the image of the translation-replaced document on the basis of the image data of the additional word-type translation document and the image data of the translation-replaced document (S112). For example, the translation apparatus 2 displays the images on the display 50, or prints out the images in terms of a printer. Here, the translation apparatus 2 may output only the image of the translation-replaced document in the Step S112. As described above, the specific processes that are performed by the translation apparatus 2 has been described. When the original document has a plurality of sheets, the translation apparatus 2 performs the processes from S101 to S112 to each page.

The embodiment of the invention is not limited to the above-described embodiment.

That is, the invention may be applicable to any language regardless of the types of first and second languages. For example, the invention may be applicable to the case where French is translated into German or the case where an archaic word is translated into modern Japanese. Additionally, for example, the invention may be applicable to even the case where a Kansai dialect is translated into a Kanto dialect.

The invention may be applicable to not only the case where the original document includes horizontally written sentences, but also a case where the original document includes vertically written sentences.

The translation apparatus 2 may determine in Step S109 whether the height of at least one of line-space region (when the original sentences are horizontally written) is smaller than that of the line space TH2. Additionally, when the height of at least one of line-space region is smaller than that of the line space TH2, the process in Step S111 is carried out. Alternatively, when the height of every line-space region is not less than that of the line space TH2, the process in Step S110 may be carried out. In this case, it is not necessary for the translation apparatus 2 to calculate an overlap ratio.

The translation apparatus 2 may set one of the ratios P1, P2, and P3 to the overlap ratio.

For example, the translation apparatus 2 calculates the ratio P1, and sets the ratio P1 to the overlap ratio when the calculated ratio P1 is larger than the predetermined threshold value TH31 or calculates the ratio P2 when the ratio P1 is not more than the predetermined threshold value TH31. Additionally, the translation apparatus 2 sets the ratio P2 to the overlap ratio when the calculated ratio P2 is larger than the predetermined threshold value TH32, or calculates the ratio P3 when the ratio P2 is not more than the predetermined threshold value TH32 and sets the calculated ratio P3 to the overlap ratio. In this way, the overlap ratio may be decided.

Figure 14:
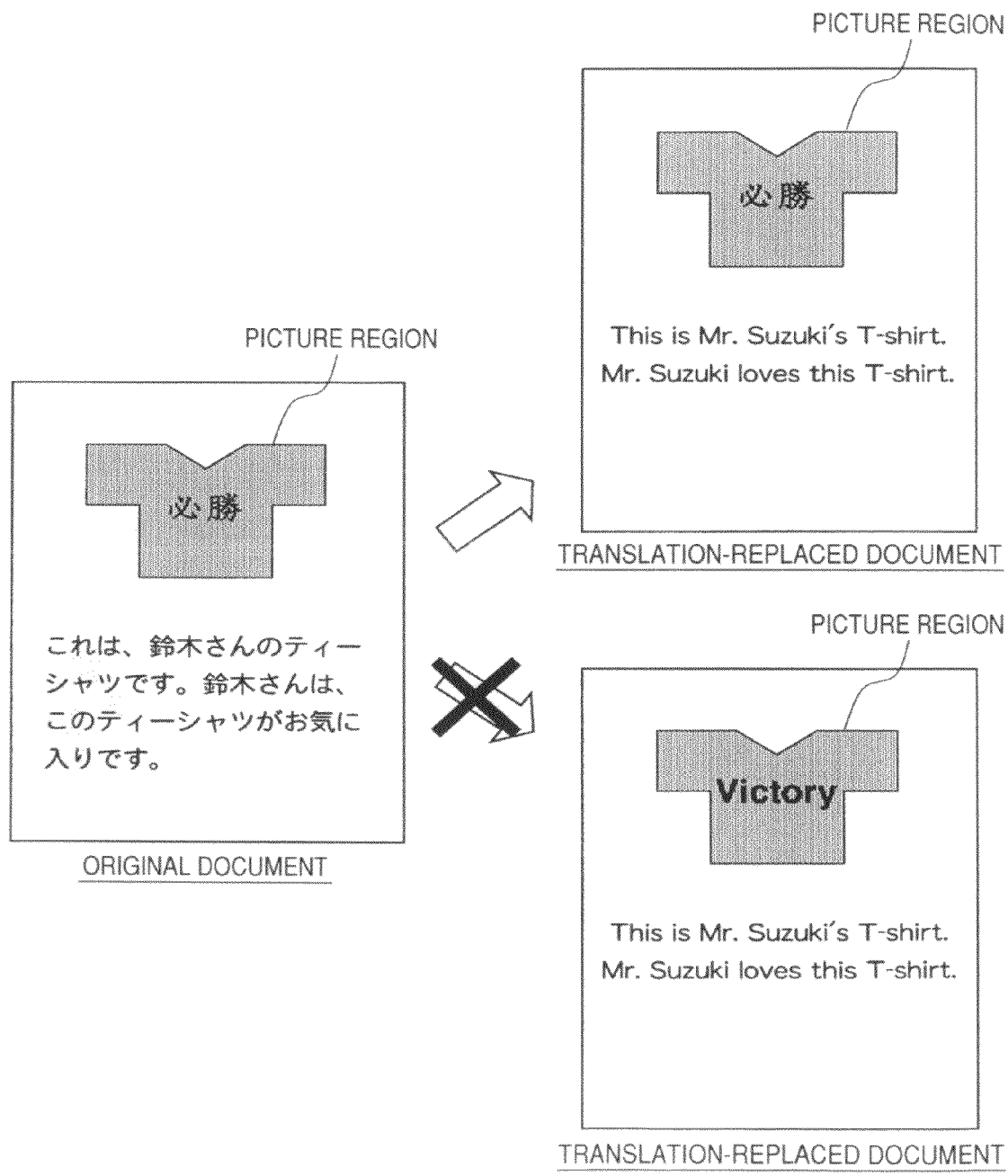
FIG. 14 is a diagram illustrating a state where the translation-replaced document is generated.
Figure 15:
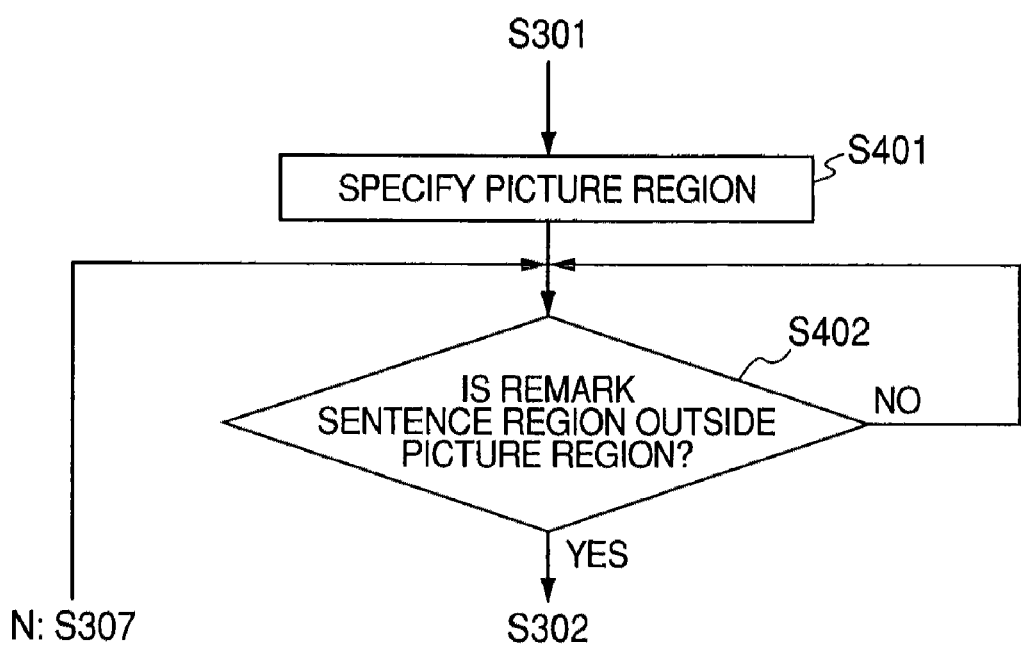
FIG. 15 is a flowchart illustrating an example of a process that is carried out by the translation apparatus according to the embodiment of the invention.

The translation apparatus 2 may generate image data of the translation-replaced document without replacing the sentence containing in the picture with the translation sentence by additionally performing in Step S111 the steps of the flowchart shown in FIG. 15 in the case where a translation-target original document includes a picture containing sentences (or words) (see FIG. 14).

That is, after Step S301, the translation apparatus 2 specifies the position/region the picture region in the original document image by the known methods (S401). For example, the translation apparatus 2 generates two-value image of a copied original document image, and performs a labeling process on the two-value image. The translation apparatus 2 sets a circumscribed rectangle for every connection component extracted by the labeling process. Then, the translation apparatus 2 calculates an occupying ratio of the connection component with respect to the circumscribed rectangle for every connection component, and then sets a region in which the occupying ratio is high to the picture region. In this way, the translation apparatus 2 specifies the picture region.

The translation apparatus 2 determines whether a remark sentence region is outside the picture region (S402), and then advances to Step S302 when the remark sentence region is outside the picture region (Y: S402) or selects other remark sentence region when the remark sentence region is inside the picture region (N: S402) to perform again the process in Step S402. In this way, the translation apparatus 2 performs the process after S302 only to the sentence region outside the picture region.

In the above-described embodiment, the translation apparatus 2 generates the additional word-type translation document (first translation document) in the image data format, but may generate that in other data formats. For example, the translation apparatus 2 may generate the additional word-type translation document as portrayal data including a portrayal position, a portrayal size, a portrayal color, and the like. In this case, the translation apparatus 2 outputs the image of the additional word-type translation document by portraying the translation sentence in each line-space region of the original document image based on the translation data.

In the same manner, the translation apparatus 2 may generate the translation-replaced document (second translation document) in other data formats other than the image data. For example, the translation apparatus 2 may generate the additional word-type translation document as portrayal data including portrayal position, portrayal size, portrayal color, and the like of every sentence of the translation document with respect to a background image (an image in which every sentence region of the original document image is painted in a background color). In this case, the translation apparatus 2 outputs an image of the translation-replaced document by portraying the translation sentence in each line-space region of the background image based on the portrayal data.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

Figure 9:
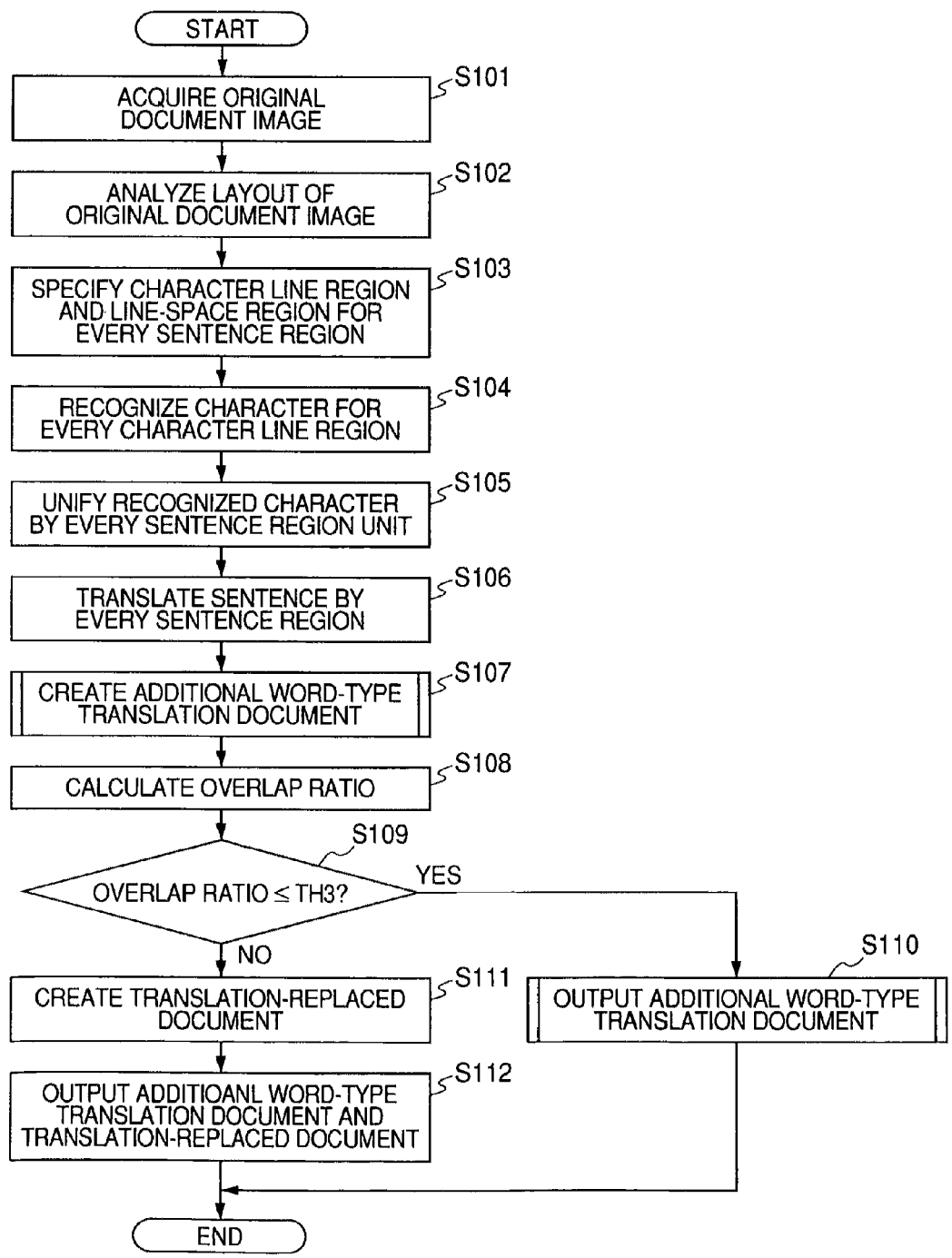
FIG. 9 is a flowchart illustrating an example of a process that is carried out by the translation apparatus according to the embodiment of the invention.
Figure 10:
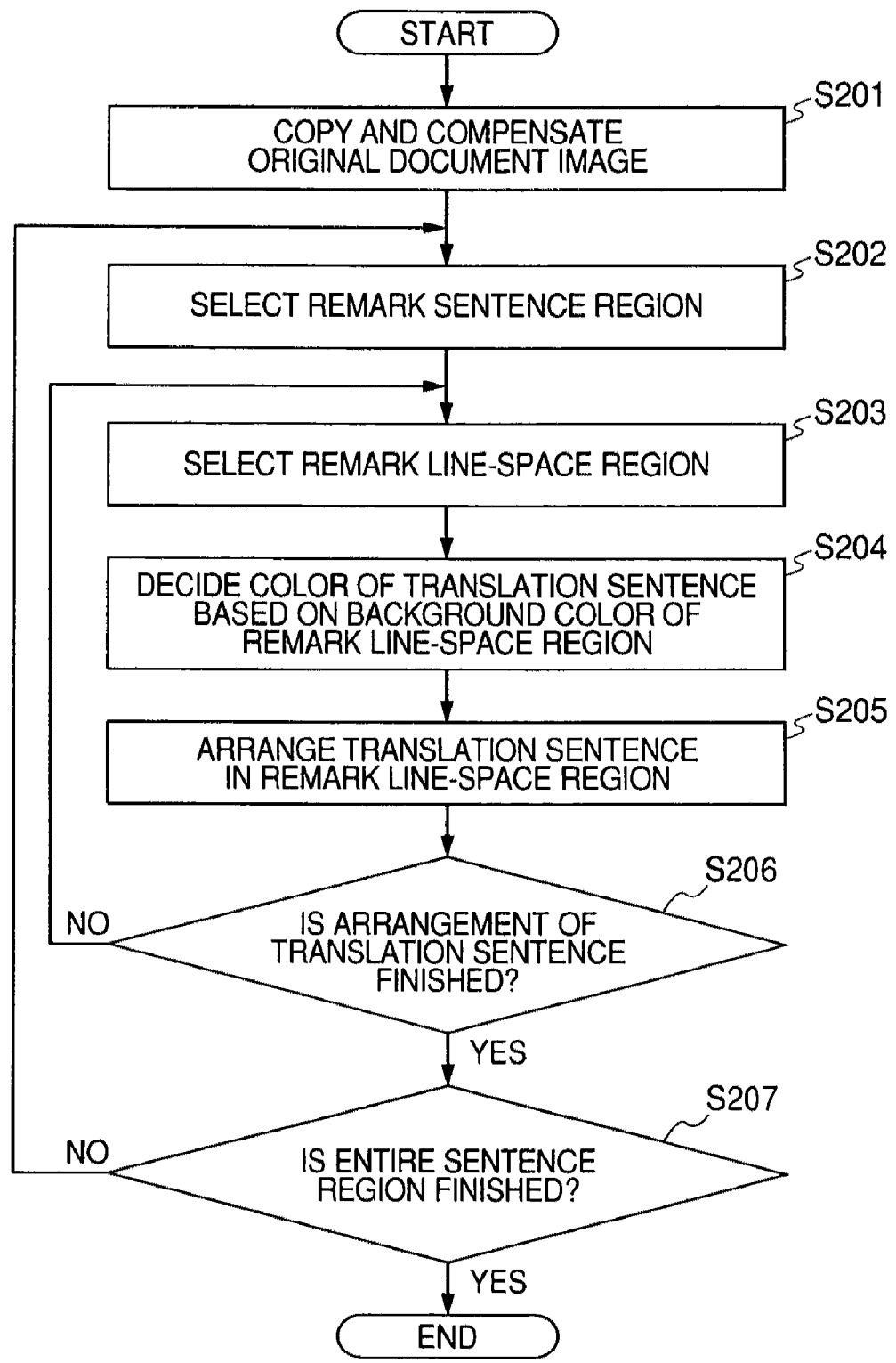
FIG. 10 is a flowchart illustrating an example of the process that is carried out by the translation apparatus according to the embodiment of the invention.

FIG. 1
40 CENTRAL PROCESS UNIT
42 MAIN MEMORY
44 AUXLILARY MEMORY
46 IMAGE READING UNIT
48 OPERATION UNIT
50 DISPLAY
FIG. 2
2 TRANSLATION APPARATUS
60 ORIGINAL DOCUMENT IMAGE ACQUIRING UNIT
62 LINE-SPACE REGION SPECIFYING UNIT
64 TRANSLATION UNIT
66 ADDITIONAL WORD-TYPE TRANSLATION DOCUMENT CREATING UNIT
68 OVERLAP DETERMINING UNIT
70 TRANSLATION-REPLACED DOCUMENT CREATING UNIT
72 TRANSLATION-RESULT OUTPUT UNIT
FIG. 5
A CHARACTER LINE REGION
B LINE-SPACE REGION (SET IMAGINARY LINE-SPACE REGION AT FIRST LINE)
FIG. 7
A CHARACTER OF TRANSLATION SENTENCE DISPOSED IN LINE-SPACE REGION LARGER THAN TH
B CHARACTER OF TRANSLATION SENTENCE IN LINE-SPACE REGION NOT MORE THAN TH
FIG. 9
S101 ACQUIRE ORIGINAL DOCUMENT IMAGE
S102 ANALYZE LAYOUT OF ORIGINAL DOCUMENT IMAGE
S103 SPECIFY CHARACTER LINE REGION AND LINE-SPACE REGION FOR EVERY SENTENCE REGION
S104 RECOGNIZE CHARACTER FOR EVERY CHARACTER LINE REGION
S105 UNIFY RECOGNIZED CHARACTER BY EVERY SENTENCE REGION UNIT
106 TRANSLATE SENTENCE BY EVERY SENTENCE REGION
S107 CREATE ADDITIONAL WORD-TYPE TRANSLATION DOCUMENT
S108 CALCULATE OVERLAP RATIO
S109 OVERLAP RATIO $\leq$ TH3?
S110 OUTPUT ADDITIONAL WORD-TYPE TRANSLATION DOCUMENT S111 CREATE TRANSLATION-REPLACED DOCUMENT
S112 OUTPUT ADDITIOANL WORD-TYPE TRANSLATION DOCUMENT AND TRANSLATION-REPLACED DOCUMENT FIG. 10
S201 COPY AND COMPENSATE ORIGINAL DOCUMENT IMAGE
S202 SELECT REMARK SENTENCE REGION
S203 SELECT REMARK LINE-SPACE REGION
S204 DECIDE COLOR OF TRANSLATION SENTENCE BASED ON BACKGROUND COLOR OF REMARK LINE-SPACE REGION
S205 ARRANGE TRANSLATION SENTENCE IN REMARK LINE-SPACE REGION
S206 IS ARRANGEMENT OF TRANSLATION SENTENCE FINISHED?
S207 IS ENTIRE SENTENCE REGION FINISHED?

FIG. 11
A CHARACTER OF TRANSLATION SENTENCE OF WHICH CIRCUMSCRIBED RECTANGLE DOES NOT INCLUDE CHARACTER OF ORIGINAL SENTENCE
B CHARACTER OF TRANSLATION SENTENCE OF WHICH CIRCUMSCRIBED RECTANGLE INCLUDES CHARACTER OF ORIGINAL SENTENCE

Figure 13:
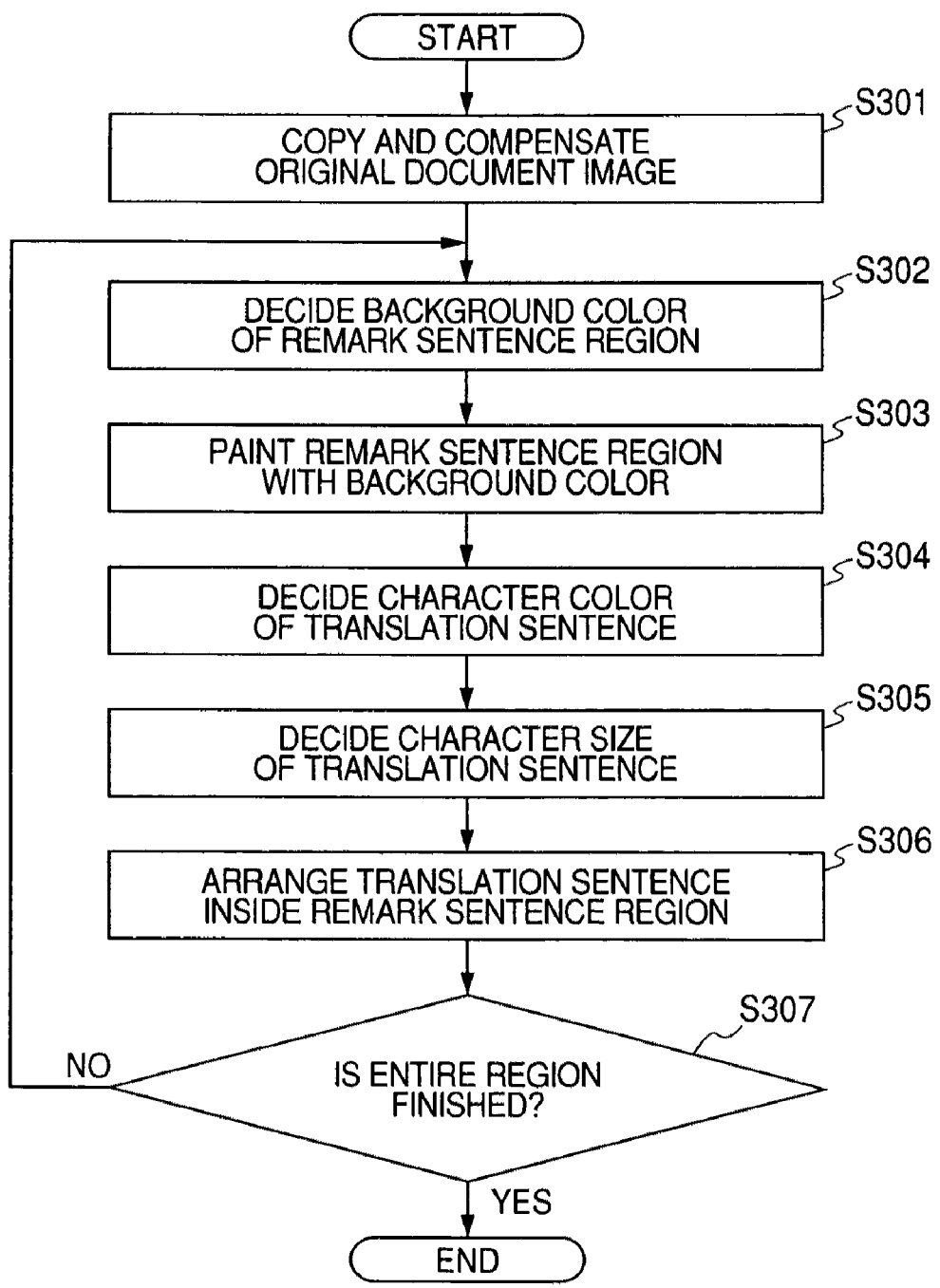
FIG. 13 is a flowchart illustrating an example of a process that is carried out by the translation apparatus according to the embodiment of the invention.

FIG. 13
S301 COPY AND COMPENSATE ORIGINAL DOCUMENT IMAGE
S302 DECIDE BACKGROUND COLOR OF REMARK SENTENCE REGION
S303 PAINT REMARK SENTENCE REGION WITH BACKGROUND COLOR
S304 DECIDE CHARACTER COLOR OF TRANSLATION SENTENCE
S305 DECIDE CHARACTER SIZE OF TRANSLATION SENTENCE
S306 ARRANGE TRANSALTION SENTENCE INSIDE REMARK SENTENCE REGION
S307 IS ENTIRE REGION FINISHED?

FIG. 15
S401 SPECIFY PICTURE REGION
S402 IS REMARK SENTENCE REGION OUTSIDE PICTURE REGION?

What is claimed is:

1. A translation apparatus comprising:
an image acquiring unit that acquires an original document image read from an original document including an original sentence in a first language;
a translating unit that translates the original sentence included in the original document image into a second language;
a line-space specifying unit that specifies a line-space region for each line of the original sentence included in the original document image;
a first translation document creating unit that creates a first translation document by arranging a translation sentence in each line-space region of the original document image;
a second translation document creating unit that creates a second translation document by replacing the original sentence in the original document image with the translation sentence;
a determining unit that determines for each line-space region whether a non-interference condition is satisfied on the basis of whether the original sentence overlaps with the translation sentence; and
an output unit that outputs the first translation document in a case where the non-interference condition is satisfied, or that outputs the second translation document in a case where the non-interference condition is not satisfied.

2. The translation apparatus as claimed in claim 1, wherein
the determining unit determines whether the non-interference condition is satisfied depending on whether a gap between the line-space regions is not less than a predetermined threshold value.

3. The translation apparatus as claimed in claim 2, wherein
the determining unit determines whether the non-interference condition is satisfied on the basis of a number of characters of a translation sentence arranged in a narrow-line-space region corresponding to a line space smaller than the predetermined threshold value in the first translation document.

4. The translation apparatus as claimed in claim 3, wherein
the determining unit determines that the non-interference condition is satisfied if a ratio of the number of characters of the translation sentence arranged in the narrow-line-space region to a number of total characters of all translation sentences is smaller than a predetermined ratio.

5. The translation apparatus as claimed in claim 2, further comprising:
a threshold value deciding unit that decides the predetermined threshold value depending on a combination of the first language and the second language.

6. The translation apparatus as claimed in claim 1, wherein
the determining unit determines whether the non-interference condition is satisfied depending on whether a character of the original sentence interferes with a rectangle region circumscribing a character of the translation sentence in the first translation document.

7. The translation apparatus as claimed in claim 6, wherein
the determining unit determines whether the non-interference condition is satisfied on the basis of a number of characters of the translation sentence of which the rectangle region interferes with the character of the original sentence.

8. The translation apparatus as claimed in claim 7, wherein
the determining unit determines that the non-interference condition is satisfied if a ratio of the number of characters of the translation sentence of which the rectangle region interferes with the character of the original sentence with respect to the number of total characters of all translation sentences is not more than a predetermined ratio.

9. The translation apparatus as claimed in claim 1, wherein
the determining unit determines whether the non-interference condition is satisfied depending on whether a character of the original sentence interferes with that of the translation sentence in the first translation document.

10. The translation apparatus as claimed in claim 9, wherein
the determining unit determines whether the non-interference condition is satisfied on the basis of a number of pixels of a portion where the character of the translation sentence interferes with that of the original sentence.

11. The translation apparatus as claimed in claim 10, wherein
the determining unit determines that the non-interference condition is satisfied if a ratio of the number of pixels of the portion where the character of the translation sentence interferes with that of the original sentence with respect to the number of total pixels of characters of all translation sentences is not more than a predetermined ratio.

12. The translation apparatus as claimed in claim 1, wherein
the first translation document creating unit arranges the translation sentence in each line-space region after smoothing a pixel value in each line-space region.

13. The translation apparatus as claimed in claim 1, wherein
the first translation document creating unit arranges the translation sentence in each line-space region after setting a pixel value of each line-space region to a predetermined value.

14. The translation apparatus as claimed in claim 1, wherein
the first translation document creating unit decides a character color of the translation sentence arranged in each line-space region depending on a background color of the line-space region.

15. The translation apparatus as claimed in claim 1, wherein
the original document includes a picture, and
the second translation document creating unit specifies a picture region of the picture in the original document image, and in a case where at least a part of the original sentence is included in the specified region, restricts the at least a part thereof from being replaced with the translation sentence.

16. The translation apparatus as claimed in claim 1, the line-space region is defined by an average character height of the original sentence.

17. The translation apparatus as claimed in claim 1, the first translation document creating unit creates the first translation document by arranging a translation sentence in each line-space region of the original document image so as to show the translation sentence in a format of the original document image without the original sentence and the translation sentence overlapping.

18. A translation method comprising:
acquiring an original document image read from an original document including an original sentence in a first language;
translating the original sentence included in the original document image into a second language; p1 specifying a line-space region for each line of the original sentence included in the original document image;
creating a first translation document by arranging a translation sentence in each line-space region of the original document image;
creating a second translation document by replacing the original sentence in the original document image with the translation sentence;
determining for each line-space region whether a non-interference condition is satisfied on the basis of whether the original sentence overlaps with the translation sentence; and
outputting the first translation document in a case where the non-interference condition if the original sentence overlaps with the translation sentence is satisfied, or outputting the second translation document in a case where the non-interference condition is not satisfied.

19. A computer readable medium storing a program causing a computer to execute a process for outputting a translation sentence, the process comprising:
acquiring an original document image read from an original document including an original sentence in a first language;
translating the original sentence included in the original document image into a second language;
specifying a line-space region for each line of the original sentence included in the original document image;
creating a first translation document by arranging a translation sentence in each line-space region of the original document image;
creating a second translation document by replacing the original sentence in the original document image with the translation sentence;
determining for each line-space region whether a non-interference condition is satisfied on the basis of whether the original sentence overlaps with the translation sentence; and
outputting the first translation document in a case where the non-interference condition if the original sentence overlaps with the translation sentence is satisfied, or outputting the second translation document in a case where the non-interference condition is not satisfied.

20. A translation apparatus comprising:
an image acquiring unit that acquires an original document image read from an original document including an original sentence in a first language;
a translating unit that translates the original sentence included in the original document image into a second language;
a line-space specifying unit that specifies a line-space region for each line of the original sentence included in the original document image;
a first translation document creating unit that creates a first translation document by arranging a translation sentence in each line-space region of the original document image;
a second translation document creating unit that creates a second translation document by replacing the original sentence in the original document image with the translation sentence;
a determining unit that determines for each line-space region whether a non-interference condition is satisfied on the basis of a ratio defining how much the translating sentence overlaps with the original sentence; and
an output unit that outputs the first translation document in a case where the non-interference condition is satisfied, or that outputs the second translation document in a case where the non-interference condition is not satisfied.

* * * * *